(12) United States Patent
Yamauchi

(10) Patent No.: US 8,869,827 B2
(45) Date of Patent: Oct. 28, 2014

(54) PRESSURE REGULATOR

(75) Inventor: Takeshi Yamauchi, Tokyo (JP)

(73) Assignee: Koganei Corporation, Tokyo (JP)

( * ) Notice: Subject to any disclaimer, the term of this patent is extended or adjusted under 35 U.S.C. 154(b) by 260 days.

(21) Appl. No.: 13/061,775

(22) PCT Filed: Sep. 25, 2008

(86) PCT No.: PCT/JP2008/067314
§ 371 (c)(1),
(2), (4) Date: Mar. 2, 2011

(87) PCT Pub. No.: WO2010/035323
PCT Pub. Date: Apr. 1, 2010

(65) Prior Publication Data
US 2011/0162737 A1    Jul. 7, 2011

(51) Int. Cl.
*G05D 16/02* (2006.01)
*F16F 7/116* (2006.01)

(52) U.S. Cl.
USPC ............ 137/505.13; 137/505.18; 137/505.37

(58) Field of Classification Search
USPC ............ 137/505.13, 505.18, 505.26, 505.36, 137/505.37
See application file for complete search history.

(56) References Cited

U.S. PATENT DOCUMENTS

| | | | | |
|---|---|---|---|---|
| 1,874,293 A | * | 8/1932 | Hook et al. | 137/487.5 |
| 2,518,387 A | * | 8/1950 | Shaw | 137/514.5 |
| 2,831,758 A | * | 4/1958 | Warner et al. | 48/184 |
| 3,545,471 A | * | 12/1970 | Taplin | 137/116.5 |
| 6,068,014 A | | 5/2000 | Tomita | |
| 6,079,434 A | * | 6/2000 | Reid et al. | 137/14 |

FOREIGN PATENT DOCUMENTS

| | | |
|---|---|---|
| JP | 6-86105 U | 12/1994 |
| JP | 10268943 A | 10/1998 |
| JP | 2003316444 A | 11/2003 |
| JP | 2007004582 A | 1/2007 |
| JP | 3911372 B2 | 2/2007 |
| JP | 2007285320 A | 11/2007 |
| JP | 2009-26054 A | 2/2009 |

OTHER PUBLICATIONS

International Search Report for PCT/JP2008/067314 dated Oct. 14, 2008.

* cited by examiner

*Primary Examiner* — William McCalister
(74) *Attorney, Agent, or Firm* — McCormick, Paulding & Huber LLP

(57) ABSTRACT

A communication hole 17, which communicates with a primary-side port 15 and a secondary-side port 16, is opened and closed by a valve element 21 contacting with a valve seat 18, and a spring force in a direction of contacting with the valve seat 18 is applied to the valve element 21 by a valve spring 25. A pressure-regulating diaphragm 27 is mounted in a housing 11 opposite the valve element 21, and a spring force in a direction of opening the valve element 21 is biased to the pressure-regulating diaphragm 27 by a pressure-regulating spring 43. A tip face 49 that opens and closes a relief hole 47 is provided, and a stem 47 that converts, to the valve element 21, a movement of the pressure-regulating diaphragm 27 toward the valve element 21 is provided in the valve element 21. The pressure-regulating diaphragm 27 is provided with a dynamic-vibration absorbing apparatus 50, which suppresses a vibration of the pressure-regulating diaphragm 27 at an exhausting time of being exhausted from the relief hole 37, and vibrations of a diaphragm assembly 38 and a valve assembly 26 at a pressure-regulating time.

12 Claims, 4 Drawing Sheets

PRESSURE REGULATOR

CROSS REFERENCE TO RELATED APPLICATIONS

This application is entitled to the benefit of and incorporates by reference essential subject matter disclosed in International Patent Application No. PCT/JP2008/67314 filed on Sep. 25, 2008.

TECHNICAL FIELD

The present invention relates to a pressure regulator, which regulates, according to a predetermined pressure, a pressure of a pressure fluid fed from a fluid supply source and supplies it to a fluid-pressure operating appliance.

BACKGROUND OF THE INVENTION

The pressure regulator is used to regulate, according to the predetermined pressure, a pressure of compressed air fed from a pneumatic source that is the fluid supply source, and to supply the compressed air to a pneumatic operating appliance such as a pneumatic cylinder. The pressure regulator has, as disclosed in for example Japanese Patent Application laid-Open Publication No. 10-268943, a primary-side port to which compressed air is supplied, and a secondary-side port to which a pneumatic operating appliance is connected, wherein an end portion of an opening of a communication hole that communicates with both ports may be opened and closed by a valve element. A spring force in a direction of closing a valve seat of the end portion of the opening is applied to the valve element by a valve spring. The pressure regulator has a diaphragm that is elastically deformed by a differential pressure between a set pressure of the secondary-side port and an atmospheric pressure. A relief hole, through which air at a secondary level is discharged to an outside, is formed in the diaphragm. A tip of a stem attached to the valve element abuts on the diaphragm to close the relief hole, and a spring force in a direction of opening the valve seat through the stem is applied to the diaphragm by a pressure-regulating spring.

In the pressure regulator as mentioned above, when a pressure of a secondary side is lower than a set pressure, the spring force of the pressure-regulating spring causes the diaphragm to open the valve seat via the stem, and the compressed air on a primary side is supplied to the secondary-side port. When a pressure of the compressed air in the secondary-side port reaches the set pressure, a pneumatic pressure applied to the diaphragm causes the diaphragm to be displaced in a direction of separating from the valve element, and the valve element contacts with and closes the valve seat, whereby a communication with the primary-side port and the secondary-side port is cut off.

Meanwhile, when a secondary-side pressure rises higher than the set pressure, the diaphragm is displaced in the direction of separating from the valve element, and the diaphragm separates from a tip of the stem to open the relief hole, whereby the secondary-side pressure is discharged to the outside. When the secondary-side pressure falls, the diaphragm contacts with the stem to close the relief hole. Accordingly, for example, in reducing a pressure in compressed air supplied to the pneumatic operating appliance when a pressure used for a pneumatic circuit having the pneumatic operating appliance is decreased, a new secondary-side pressure is set low. By doing so, the compressed air in a secondary-side pipe is exhausted via the relief hole to the outside up to the set pressure that has been newly set. Also, when the set pressure on a secondary side rises due to applying from the outside a load in a direction opposite to an operating direction of a rod of the pneumatic cylinder etc., the compressed air in the secondary-side pipe is exhausted via the relief hole to the outside to make the set pressure constant.

When a pressure in the compressed air supplied to the secondary-side port is set to actuate intermittently the pneumatic operating appliance such as a pneumatic cylinder, air on the secondary side is consumed, and its pressure is also changed intermittently, whereby the valve seat is more frequently opened and closed by the valve element. Therefore, since a flow of the compressed air from the primary-side port to the secondary-side port becomes intermittent, the valve element vibrates, whereby vibration noises occur, and the secondary-side pressure varies constantly, as a result of which stability deteriorates. Meanwhile, when the air in the secondary-side pipe is exhausted via the relief hole, the diaphragm vibrates by a reverse flow of the air from the secondary-side port to the relief hole, whereby vibration noises occur, and the secondary pressure varies constantly, as a result of which stability deteriorates. When the valve element and the diaphragm vibrate, abrasion of a seal member provided to the valve element is promoted, and degradation of the diaphragm is promoted, as a result of which durability of the pressure regulator deteriorates. Further, the concurrently occurring vibration noises may make even a work environment degenerate.

Known as a vibration controller that suppresses vibration of a vibration element is a dynamic-vibration absorbing apparatus. The dynamic-vibration absorbing apparatus comprises a mass body, a spring, and a damper, wherein the mass body is attached to a vibration controlled object via the spring. When the vibration controlled object vibrates, the mass body of the dynamic-vibration absorbing apparatus vibrates, and part of vibratory energy that the vibration controlled object has is converted into vibration energy of the mass body, whereby the vibration of the vibration controlled object is suppressed. Japanese Patent Application Laid-Open Publication No. 2007-285320 discloses a dynamic-vibration absorbing apparatus for absorbing vibration of a substrate of an electric appliance, and Japanese Patent No. 3911372 discloses a dynamic-vibration absorbing apparatus for suppressing vibration that occurs from an electric mechanism assembled in a microscope. The dynamic-vibration absorbing apparatuses have been called dynamic vibration absorbers or dynamic vibration reducers.

Problems to be Solved by the Invention

As described above, when the pressure in the compressed air supplied to the secondary-side port is set to actuate intermittently the pneumatic operating appliance such as a pneumatic cylinder, air on the secondary side is consumed, and its pressure also varies intermittently, whereby the valve seat is more frequently opened and closed by the valve element. When a frequency of the compressed air that flows from the primary-side port to the secondary-side port in a pulsating manner coincides with a natural frequency of a movable portion that includes the valve element, the valve element resonates. When the valve element vibrates, since an opening degree of the valve seat does not become equal to a predetermined opening degree that depends on the set pressure on the secondary side, the pressure on the secondary side varies and is displaced from the set pressure, whereby stability of pressure regulation of the pressure regulator deteriorates. Meanwhile, when the air in the secondary pipe is exhausted via the relief hole, the diaphragm vibrates due to the reverse flow of the air from the secondary-side port to the relief hole, and its pressure on the secondary side varies and is displaced from the set pressure, whereby the stability of the pressure regulation of the pressure regulator deteriorates. Further, the concurrently occurring vibration noises may make the work environment degenerate.

For those reasons, in a conventional pressure regulator, such design has been required that, for avoiding a resonant phenomenon occurring when the valve element opens and closes the valve seat to regulate the pressure, sliding resistance such an O-ring attached to the valve element or a stem is added as a damping element. Meanwhile, to avoid the resonant phenomenon of the diaphragm in opening the relief hole to exhaust the air on the secondary side, the following ways have been adopted: a way of designing a diaphragm with a big elastic coefficient to lower movability of the diaphragm; a way of attaching a rubber member etc. as a damping element to a valve element or stem; and the like. Thus, providing the damping element to each of the valve element and the diaphragm is a factor in preventing opening and closing movements of the valve element, thereby making pressure-regulating response performance significantly deteriorate.

As described above, a pressure-regulating time of making the valve element actuated, and an exhausting time of exhausting the air in the secondary-side port to the outside are different from each other in a vibration system of the pressure regulator. That is, at the pressure-regulating time, the vibration system of the valve element vibrates, and at the exhausting time, the diaphragm is separate from the valve element, whereby a vibration system of the diaphragm vibrates. To suppress the vibrations of those vibration systems by the dynamic-vibration absorbing apparatus, the dynamic-vibration absorbing apparatus needs to be mounted to each of the vibration systems, but it is difficult to mount the plural dynamic-vibration absorbing apparatuses into a limited space. In addition, since flow paths of air are formed in the pressure regulator, mounting of the dynamic-vibration absorbing apparatus at a position where the flows of air are not prevented causes a pressure-regulating characteristic to deteriorate.

An object of the present invention is to enhance a pressure-regulating stability of a pressure regulator.

An object of the present invention is to inhibit, without interfering with flows of air, vibration occurrence of a valve element and a diaphragm to enhance the pressure-regulating stability of the pressure regulator.

An object of the present invention is to inhibit the vibration occurrence of the valve element and the diaphragm to improve durability of the pressure regulator.

MEANS FOR SOLVING THE PROBLEMS

Summary of the Invention

A pressure regulator according to the present invention comprises: a housing including a primary-side port, to which a pressure fluid is supplied, and a secondary-side port, which communicates with the primary-side port via a communication hole and from which the pressure fluid flows; a valve assembly having a valve element, which opens and closes a valve seat formed on an opening end portion side of the communication hole, and a valve spring, which biases a spring force in a direction of closing the valve seat with respect to the valve element; a diaphragm assembly including a pressure-regulating diaphragm and a pressure-regulating spring, the pressure-regulating diaphragm being mounted in the housing opposite the valve element, and forming, by partition, a pressure-regulating chamber communicating with the secondary-side port and a spring chamber communicating with an outside, the pressure-regulating spring being mounted between a retainer provided on the pressure-regulating diaphragm and a spring receiving member disposed in the spring chamber opposite the retainer, and biasing, to the valve element, a spring force in a direction of releasing the valve element from the valve seat; a stem having a tip face that opens and closes a relief hole, the relief hole being formed in the retainer and causing the pressure-regulating chamber and the spring chamber to communicate with each other, the stem applying a spring force of the pressure-regulating spring to the valve element, and constituting the valve assembly; and a dynamic-vibration absorbing apparatus, which is attached to the retainer and disposed in the spring chamber, suppresses a vibration of the diaphragm assembly when the diaphragm is separate from the stem, and suppresses vibrations of the diaphragm assembly and the valve assembly when the valve assembly is moved with the diaphragm assembly to open and close the valve seat and adjusts a pressure in the secondary-side port.

In the pressure regulator according to the present invention, the dynamic-vibration absorbing apparatus includes: an annular damper, which is fixed to a tip of a support rod portion provided protrudingly from the retainer toward the spring receiving member; an annular mass body provided to the annular damper; and a spring member mounted between the diaphragm and the annular mass body. In the pressure regulator according to the present invention, the retainer has a disk portion, to which the support rod portion is provided and which contacts the diaphragm, the dynamic-vibration absorbing apparatus being positioned and mounted at a tip of the support rod inside the pressure-regulating spring that is mounted between the disk portion and the spring receiving member. In the pressure regulator according to the present invention, a natural frequency of the dynamic-vibration absorbing apparatus is made different from a natural frequency of a diaphragm vibration system constituted by the diaphragm assembly, and from a composite natural frequency of a composite vibration system constituted by the valve assembly and diaphragm assembly.

The pressure regulator according to the present invention is such that a tip portion of the stem is provided with a seal member, which seals a communication between the secondary-side port and the pressure-regulating chamber via a penetration hole slidably supporting the tip portion of the stem. The pressure regulator according to the present invention is such that a tip portion of the stem is provided with a diaphragm, which movably supports the stem in a direction of opening and closing the relief hole, and seals a communication between the secondary-side port and the pressure-regulating chamber. The pressure regulator according to the present invention further comprises a pressure-balancing seal member, which forms a seal between the valve element and a guide hole into which the valve element is incorporated. The pressure regulator according to the present invention further comprises a pressure-balancing diaphragm, which forms a seal between the valve element and a guide hole into which the valve element is incorporated.

Effects of the Invention

According to the present invention, at the pressure-regulating time of adjusting a pressure in air supplied to the secondary-side port by opening and closing the valve element, occurrence of the vibrations of the valve assembly and the diaphragm assembly is prevented by the dynamic-vibration absorbing apparatus mounted in the diaphragm assembly. At the exhausting time of discharging compressed air in the secondary-side port to the outside via the relief hole, occurrence of the vibration of the diaphragm assembly is prevented by the dynamic-vibration absorbing apparatus mounted in the diaphragm assembly. Therefore, pressure-regulating stability of the compressed air supplied to the secondary-side port can be enhanced.

Since the occurrence of the vibrations of the valve assembly and the diaphragm assembly can be suppressed, degradation of the valve element and the diaphragm and abrasion can be reduced, and durability of the pressure regulator can be improved. Further, at the same time, occurrence of vibration noises is also prevented, and improvement of a work environment can be also made.

Since the synchronized vibrations of the valve assembly and the diaphragm assembly can be prevented by the dynamic-vibration absorbing apparatus, and since the vibration of the diaphragm assembly can be also prevented, occurrence of vibration at a time of actuating the pressure regulator can be prevented by the one dynamic-vibration absorbing apparatus.

Since the dynamic-vibration absorbing apparatus is incorporated into the pressure-regulating spring of the diaphragm assembly, the dynamic-vibration absorbing apparatus prevents a flow of air inside the pressure regulator from being inhibited.

DESCRIPTION OF THE PREFERRED EMBODIMENTS

Figure 1:
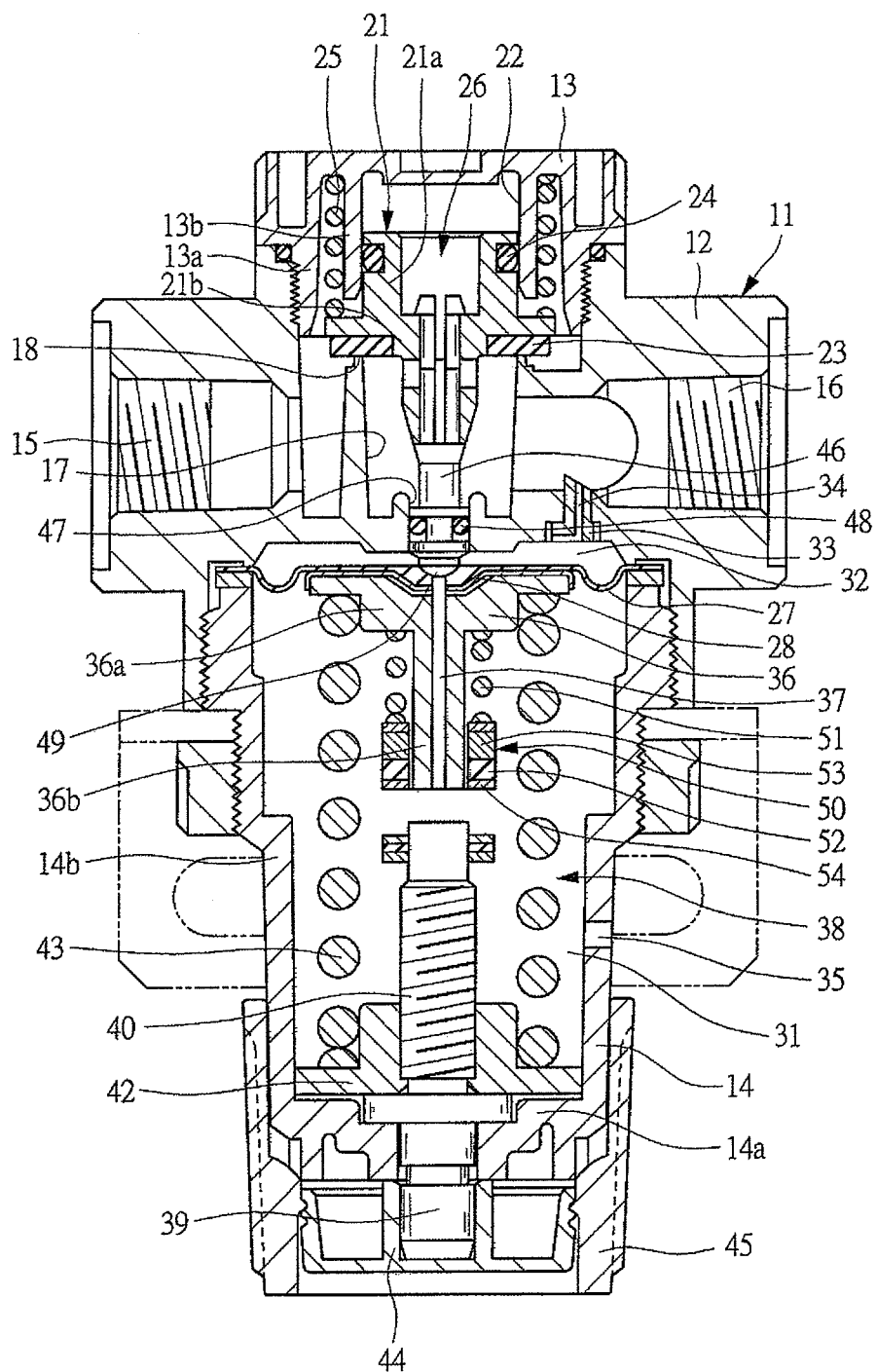
FIG. 1 is a sectional view of a pressure regulator according to an embodiment of the present invention.

Hereafter, embodiments of the present invention will be detailed based on the accompanying drawings. As shown in FIG. 1, a pressure regulator has a housing 11, and the housing 11 comprises a housing main body 12, a cap 13 attached thereto, and a bonnet 14 attached to the housing main body 12 opposite the cap 13. Concentrically formed in the housing main body 12, as shown in FIG. 1, are a primary-side port 15 communicating with a compressed-air supply source as a fluid-pressure supply source, and a secondary-side port 16 communicating with a pneumatic operating appliance as a fluid-pressure operating appliance such as a pneumatic cylinder. A communication hole 17, which causes the primary-side port 15 and the secondary-side port 16 to communicate with each other, is formed in the housing main body 12 in a direction orthogonal to central axes of the both ports 15 and 16. The communication hole 17 has an opening portion opposing the cap 13, and a valve seat 18 is formed on an opening-portion side of the communication hole 17 in the housing main body 12.

A valve element 21 is mounted axially reciprocably inside the cap 13, and the valve element 21 is actuated so as to become in a state of contacting with and closing the valve seat 18, and in a state of being separate from and opening the valve seat 18. The valve element 21 has a shaft 21a assembled in and slidably fitted in a guide hole 22 that is formed in the cap 13, and a flange portion 21b that is provided integrally with a tip portion of the shaft and opposes the valve seat 18. A front face of the flange portion 21b is provided with a rubber-made seal member 23 that contacts with the valve seat 18. The shaft 21a is provided with a pressure-balancing seal member 24, which contacts with an inner circumferential face of the guide hole 22 and seals communication between the shaft 21a of the valve element 21 and the primary-side port 15 and the secondary-side port 16. Incidentally, a pressure regulator of such a type as not to provide the seal member 24 to the shaft 21a of the valve element 21 may be used.

The cap 13 has a cylindrical attachment portion 13a provided with a male thread that is screwed to a female thread formed in the housing main body 12, and a guide cylinder portion 13b that is integrated with the cap 13 and in which the guide hole 22 is formed. A compressed coil spring as a valve spring 25 is assembled in a space between the attachment portion 13a and the guide cylinder portion 13b. This valve spring 25 is such that one end face of the valve spring abuts on an outer face of the flange portion 21b of the valve element 21, and that the other end face abuts on an inner face of the cap 13, whereby a spring force in a direction of closing the valve seat 18 is applied to the valve element 21 due to the valve spring 25. The valve element 21 and the valve spring 25 constitute a valve assembly 26.

A pressure-regulating diaphragm 27 made of rubber is mounted in a state of being sandwiched and clipped by the housing main body 12 and the bonnet 14 screwed therein, and a reinforcement disk 28 is attached to the pressure-regulating diaphragm 27. Partitioned by the pressure-regulating diaphragm 27 are a spring chamber 31 inside the bonnet 14 and a pressure-regulating chamber 32 on the housing main body 12 side. An aspirator 33 formed of a pipe member is attached to the housing main body 12. One end portion of the aspirator 12 is opened to the pressure-regulating chamber 32, and the other end portion thereof is opened to the secondary-side port 16, whereby the pressure-regulating chamber 32 communicates with the secondary-side port 16 via a pilot hole 34 of the aspirator 33. The spring chamber 31 communicates with the outside via a bleed port 35 formed in the bonnet 14, and the spring chamber 31 becomes in a state of atmospheric pressure.

A retainer 36 is attached via the reinforcement disk 28 on a spring chamber 31 side of the pressure-regulating diaphragm 27. The retainer 36 has a disk portion 36a striking the pressure-regulating diaphragm 27 via the reinforcement disk 28, and a support rod portion 36b that is integral therewith and protrudes axially. Formed around a central axis of the pressure-regulating diaphragm 27, reinforcement disk 28, and retainer 36 is a relief hole 37 that causes the pressure-regulating chamber 32 and the spring chamber 31 to communicate with each other. A diaphragm assembly 38 is formed by the pressure-regulating diaphragm 27, reinforcement disk 28, retainer 36, and pressure-regulating spring 43.

The bonnet 14 has a cylindrical portion 14b with which an end wall portion 14a is integral, and a male thread, which is screwed to a female thread formed in the housing main body 12, is formed at an opening end portion of the cylindrical portion 14b, whereby the bonnet 14 is screwed into the housing main body 12. An adjustment screw shaft 39 is rotatably mounted into the end wall portion 14a, and a male thread 40 of the adjustment screw shaft 39 is screwed into a spring receiving member 42 that is disposed inside the spring chamber 31. A compressed coil spring as the pressure-regulating spring 43 is mounted between the spring receiving member 42 and the disk portion 36a of the retainer 36 fixed to the pressure-regulating diaphragm 27, and a spring force in a direction of being directed to the valve element 21 and releasing the valve element 21 from the valve seat 18 is applied to the pressure-regulating diaphragm 27 by the pressure-regulating spring 43. To adjust the spring force, an operation handle 44 is attached to the adjustment screw shaft 39. When the spring receiving member 42 is axially moved by rotating the adjustment screw shaft 39 via the operation handle 44, an amount of contraction of the pressure-regulating spring 43 is adjusted. By doing so, the spring force applied to the pressure-regulating diaphragm 27 is adjusted according to the contraction amount. A lock cover 45 is attached to the operation handle 44, whereby the operation handle 44 is operated by the lock cover 45, and when the lock cover 45 is moved axially, rotation of the operation handle 44 is inhibited.

A stem 46 formed of, for example, a metal rod-shaped member is attached to the valve element 21, and the stem 46 constitutes part of the valve assembly 26. A base end portion of the stem 46 is fitted into an attachment hole formed in the valve element 21, and the stem 46 is fixed to the valve element 21 by a securing portion formed in the base end portion. A tip portion of the stem 46 penetrates into a penetration hole 47 formed in the housing main body 12, and its tip face 49 become hemispheric. An O-ring 48, which is in slidable contact with an inner face of the penetration hole 47, is attached to the tip portion of the stem 46, and the tip portion of the stem 46 is supported by the housing main body 12 so as to form a seal between the communication hole 17 and the pressure-regulating chamber 32 by the O-ring 48. The stem 46 is axially reciprocable with the valve element 21. Therefore, when the hemispheric tip face 49 of the stem 46 contacts with the pressure-regulating diaphragm 27, the relief hole 37 is closed, and when the pressure-regulating diaphragm 27 is separate from the stem 46, the relief hole 37 is opened.

Figure 2A:
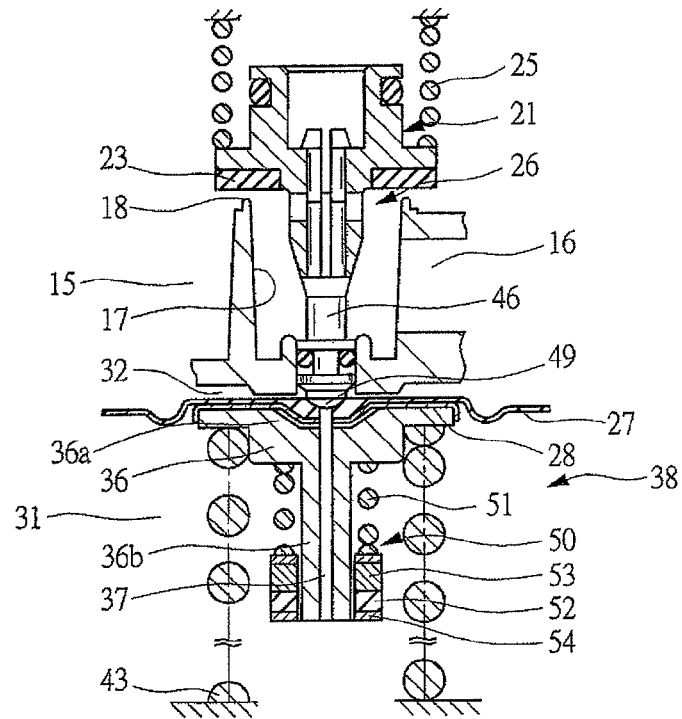
FIG. 2A is a sectional view showing a valve assembly and a diaphragm assembly of the pressure regulator at a pressure-regulating time.

When the pressure in the secondary-side port 16 falls, since the pressure in the pressure-regulating chamber 32 falls due to the pilot hole 34 of the aspirator 33 communicating with the pressure-regulating chamber 32, the tip face 49 of the stem 46 blocks up the relief hole 37, as shown in FIG. 2A. Under such a blocking-up state, the valve element 21 is driven via the pressure-regulating diaphragm 27 and the stem 46 by the pressure-regulating spring 43 in a direction of being separate from the valve seat 18, whereby the valve element 21 becomes opened. At this time, an opening degree of the valve element 21 varies based on thp pressure in the pressure-regulating chamber 32, and the pressure in the secondary-side port 16 is regulated up to a set pressure. Accordingly, when the pressure in the secondary-side port 16 is lower than a pressure that has been set by a spring force of the pressure-regulating spring 43, compressed air flows via the communication hole 17 from the primary-side port 15 to the secondary-side port 16, and a pressure of the compressed air supplied to the secondary-side port 16 is regulated to a set value.

Figure 2B:
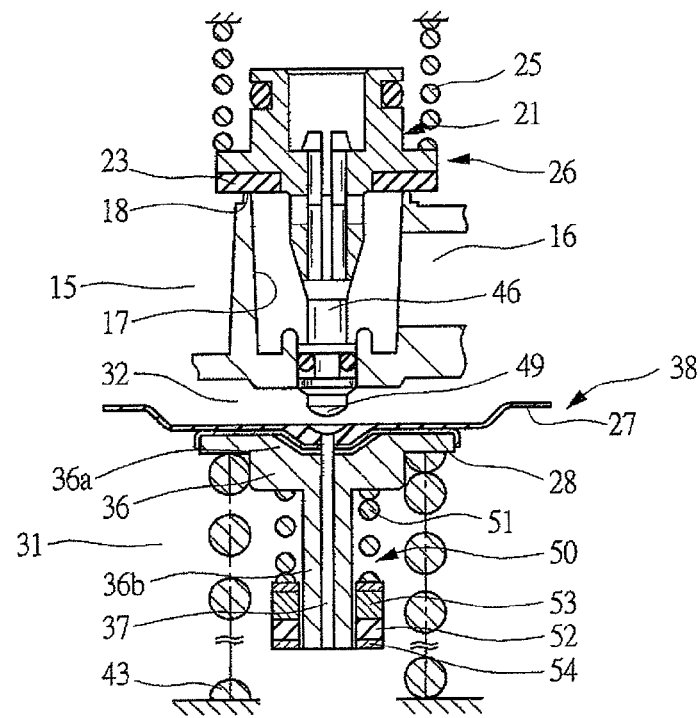
FIG. 2B is a sectional view showing the valve assembly and the diaphragm assembly at an exhausting time.

Meanwhile, when the pressure of the compressed air supplied to the secondary-side port 16 is higher than the set pressure, the valve element 21 abuts on the valve seat 18, as shown in FIG. 2B, and an axial movement of the valve element 21 is inhibited. Under such an inhibited state, the pressure-regulating spring 43 contracts due to the pressure in the pressure-regulating chamber 32, and the pressure-regulating diaphragm 27 is separate from the tip face 49 of the stem 46, whereby the relief hole 37 is opened and becomes in an exhausted state. Accordingly, when the pressure in the secondary-side port 16 is higher than the pressure that has been set by the spring force of the pressure-regulating spring 43, the compressed air supplied to the secondary-side port 16 flows in the spring chamber 31 via the relief hole 37 from the pressure-regulating chamber 32, and is discharged from the bleed port 35, whereby the pressure of the compressed air supplied to the secondary-side port 16 is regulated up to the set value. For example, when a pressure in compressed air supplied to a pneumatic operating appliance is reduced in lowering a pressure used in a pneumatic circuit that is provided with the pneumatic operating appliance, a pressure on the secondary side is newly set lower. By doing so, the compressed air in the secondary-side port 16 is exhausted to the outside via the relief hole 37 up to a set pressure that has been newly set. Also, when the set pressure on the secondary side rises due to a load in a direction opposite to an operating direction of a rod such as a pneumatic cylinder being applied from the outside, the compressed air in the secondary-side port 16 is exhausted to the outside via the relief hole 37 in order to make the set pressure constant.

The pressure regulator includes: the valve assembly 26 comprised of the valve element 21, stem 46, and valve spring 25; and a diaphragm assembly 38 comprised of the pressure-regulating diaphragm 27, reinforcement disk 28, retainer 36, and pressure-regulating spring 43, wherein their members vibrate according to situations of pressures in flow paths. If attention is focused on a vibration phenomenon, the valve assembly 26 constitutes a valve-element vibration system, and the diaphragm assembly 38 constitutes a diaphragm vibration system. Since the valve assembly 26 and the diaphragm assembly 38 are actuated in synchronization with each other at a pressure-regulating time when the valve element 21 is opened and closed, as a frequency due to pulsation of air flowing into the secondary-side port 16 from the primary-side port 15 approaches to a composite natural frequency of a composite vibration system formed by the valve assembly 26 and the diaphragm assembly 38, resonance causes vibration noises to occur, and stability of pressure adjustment to deteriorate.

Meanwhile, at an exhausting time when the air in the secondary-side port 16 is discharged from the relief hole 37 to the outside, a movement of the valve assembly 26 is inhibited for abutment of the valve member 21 on the valve seat 18, and the diaphragm assembly 38 becomes in an actuated state where it is separate from the valve assembly 26. Therefore, as a frequency due to pulsation of the air discharged via the relief hole 37 from the secondary-side port 16 to the outside approaches to a natural frequency of a diaphragm vibration system formed by the diaphragm assembly 38, resonance causes vibration noises to occur, and stability of pressure adjustment to deteriorate.

To the support rod portion 36b of the retainer 36 is mounted a dynamic-vibration absorbing apparatus 50 for suppressing the respective vibrations as mentioned above. The dynamic-vibration absorbing apparatus 50 has a coil spring 51 as a spring member, a rubber-made annular damper 52 as a damping member, and an annular weight member, i.e., an annular mass body 53. One end face of the annular damper 52 is fixed to an attachment board 54 that is fixed to a tip of the support rod portion 36b, and the annular mass body 53 is fixed to the other end face thereof. The coil spring 51 is mounted between the annular mass body 53 and the disk portion 36a of the retainer 36.

By using a space inside the pressure-regulating spring 43 mounted in the spring chamber 31, the dynamic-vibration absorbing apparatus 50 is positioned inside the space, and is incorporated into the retainer 36. The support rod portion 36b of the retainer 36 becomes concentric with a central axis of the pressure-regulating diaphragm 27, and the dynamic-vibration absorbing apparatus 50, which is cylindrical as a whole, is mounted outside the support rod portion 36b. Thus, since the dynamic-vibration absorbing apparatus 50 is disposed outside the support rod portion 36b, a flow of air flowing in the spring chamber 31 from the relief hole 37 inside the support rod portion 36b is not hindered by the dynamic-vibration absorbing apparatus 50. Additionally, since the dynamic-vibration absorbing apparatus 50 is mounted so as to be concentric with a central axis of the support rod portion 36b, even if the valve element 21 and the pressure-regulating diaphragm 27 move axially, a load is not applied in a direction of inclining each of both.

Figure 3A:
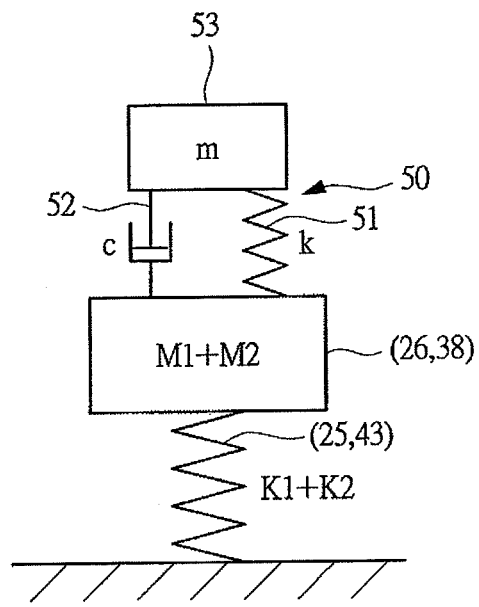
FIG. 3A is a vibration model of a composite vibration system at the pressure-regulating time.
Figure 3B:
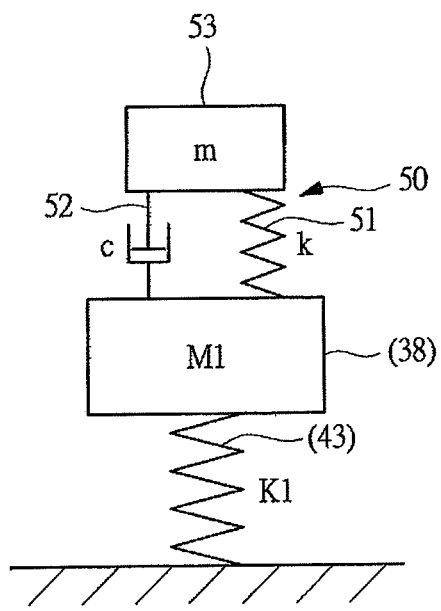
FIG. 3B is a vibration model of a diaphragm vibration system at the exhausting time.

FIG. 3A is a vibration model of a composite vibration system at a pressure-regulating time, and FIG. 3B is a vibration model of a diaphragm vibration system at an exhausting time. Incidentally, in FIGS. 3A and 3B, the symbol "m" denotes weight of the annular mass body 53; "c" a damping coefficient of the annular damper 52; "k" a spring constant of the coil spring 51; "K1" a spring constant of the pressure-regulating spring 43; "K2" a spring constant of the valve spring 25; "M1" weight of the diaphragm assembly 38; and "M2" weight of the valve assembly 26.

If it is assumed that respective natural frequencies of the diaphragm vibration system and valve-element vibration system, and a composite natural frequency of the both vibration systems are "Ω1", "Ω2", and "Ωc", then a natural frequency "ω" of the dynamic-vibration absorbing apparatus 50 is different from the natural frequency Ω1 and, concurrently, the composite natural frequency Ωc.

As shown in FIG. 2A, at the pressure-regulating time, the valve assembly 26 and the diaphragm assembly 38 become in a combined state, and move in synchronization with each other. Then, when vibration from compressed air is applied to them, FIG. 3A shown becomes a vibration model of a composite vibration system in which the dynamic-vibration absorbing apparatus 50 is attached to a vibration controlled object that comprises a mass body (M1+M2) fixed to a spring member with a spring constant (K1+K2). The composite natural frequency Ωc at this time is different from the natural frequency ω of the dynamic-vibration absorbing apparatus 50, so that the vibrations of the valve assembly 26 and the diaphragm-assembly 38 are suppressed more rapidly by the dynamic-vibration absorbing apparatus 50. This prevents an opening degree of the valve element 21 from departing extremely from a predetermined opening degree, which depends on the pressure in the pressure-regulating chamber 32, and makes it possible to stabilize, at a set pressure, the pressure in the secondary-side port 16 with high accuracy.

Meanwhile, as shown in FIG. 2B, at the exhausting time, the pressure-regulating diaphragm 27 moves separately from the stem 46. Then, when the vibration from the exhausted compressed air is applied to the diaphragm assembly 38, FIG. 3B shown becomes a vibration model of a diaphragm vibration system in which the dynamic-vibration absorbing apparatus 50 is attached to a vibration controlled object that comprises the weight M1 fixed to a spring member with a spring constant K1. The natural frequency Ω1 of the diaphragm vibration system at this time is different from the natural frequency ω of the dynamic-vibration absorbing apparatus 50, so that the vibration of the diaphragm assembly 38 is suppressed more rapidly by the dynamic-vibration absorbing apparatus 50. Therefore, vibration noises from the diaphragm assembly 38 do not occur, and the air in the secondary-side port 16 is discharged to the outside.

Thus, since the dynamic-vibration absorbing apparatus 50 is attached inside the spring chamber 31 of the pressure-regulating diaphragm 27 in the pressure regulator, the vibration of the valve assembly 26 along with the diaphragm assembly 38 at the pressure-regulating time is suppressed more rapidly without influencing opening and closing of the valve seat 18 and the relief hole 37, and the vibration of the diaphragm assembly 38 at the exhausting time is suppressed more rapidly. This prevents a resonance phenomenon of the valve element 21 from occurring at the pressure-regulating time, and a resonance phenomenon of the pressure-regulating diaphragm 27 from occurring at the exhausting time, and makes it possible to set the pressure of the air supplied to the secondary-side port 16 with high accuracy. Additionally, since occurrence of the respective resonance phenomena is prevented, abrasion of the O-ring 48 and degradation of the pressure-regulating diaphragm 27 are inhibited, and durability of the pressure regulator can be improved.

Figure 4:
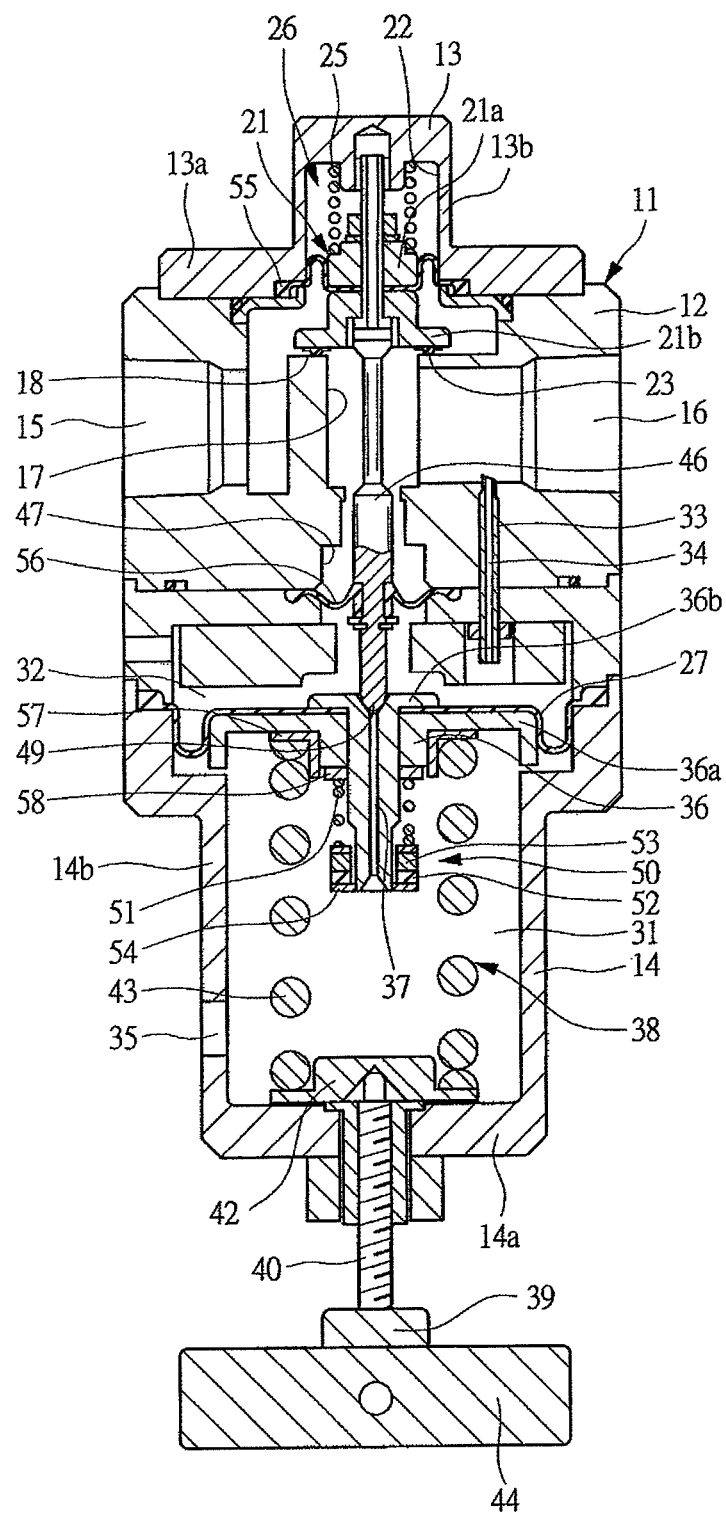
FIG. 4 is a sectional view showing a pressure regulator according to another embodiment of the present invention.

FIG. 4 is a sectional view showing a pressure regulator according to another embodiment of the present invention. In the pressure regulator shown in FIG. 1, the seal member 24 is attached to the shaft 21a of the valve element 21 to support axially slidably the valve element 21, and the O-ring 48 is attached to the tip portion of the stem 46 to support axially slidably the stem 46. Meanwhile, in the pressure regulator shown in FIG. 4, a pressure-balancing diaphragm 55 is provided in the guide hole 22 of the cap 13 that constitutes the housing 11 and into which the valve element 21 is incorporated. By this diaphragm 55, the valve element 21 is supported to the housing 11 so as to move freely backward and forward in an axial direction of the valve element 21. Further, the tip portion of the stem 46 is provided with a diaphragm 56, which movably supports the stem 46 in an opening/closing direction of the relief hole 37 and cuts off, for sealing, a communication between the secondary-side port 16 and the pressure-regulating chamber 32. By this arrangement, the valve element 21 and the stem 46 cannot be slid in the housing 11. Therefore, as shown in FIG. 1, lubrication oil does not require being applied between the guide hole 22 and the seal member 24, and between the penetration hole 47 and the O-ring 48 for ensuring slidable properties of the valve element 21 and the stem 46, and the lubrication oil is not mixed in the compressed air flowing in the pressure regulator. Accordingly, the pressure regulator shown in FIG. 4 can be used also for a pneumatic operating appliance with oil-forbidden specifications that require preventing oil from being mixed in air. Thus, also in the pressure regulator for the pneumatic operating appliance with oil-forbidden specifications, since the dynamic-vibration absorbing apparatus 50 is attached on a spring chamber 31 side of the presser-regulating diaphragm 27, this embodiment also has an effect similar to that of the above-mentioned embodiment.

Incidentally, in the another embodiment, the cap 13 has a flange-shaped attachment portion 13a fixed to the housing main body 12 by a fastening member such as a screw, and a guide cylinder portion 13b that is integral with the cap 13 and in which the guide hole 22 is formed. The valve spring 25 is attached to an end portion of the shaft 21a in the valve element 21, and is received inside the guide hole 22.

Further, the retainer 36 has the disk portion 36a struck to the pressure-regulating diaphragm 27, and the support rod portion 36b that penetrates into a radial-directional central portion of the pressure-regulating diaphragm 27. The relief hole 37 is formed around a center of an axis of the support rod portion 36b, and when the hemispheric tip face 49 of the stem 46 contacts with the support rod portion 36b, the relief hole 37 is blocked up, and when the support rod portion 36b is separate from the stem 46, the relief hole 37 is released. The pressure-regulating spring 43 and the coil spring 51 are mounted in the disk portion 36a via spring receiving members 57 and 58, and the operation handle 44 for adjusting the amount of contraction of the pressure-regulating spring 43 is a type not having the lock cover 45.

The present invention is not limited to the above-mentioned embodiments, and may be variously modified within a scope of not departing from the gist thereof. For example, as an attaching structure of the dynamic-vibration absorbing apparatus 50 to the pressure-regulating diaphragm 27, the mass body may be attached relatively movably to the pressure-regulating diaphragm 27 by the spring member and the damping member and, needless to say, such a structure is not limited to the above-mentioned embodiments.

INDUSTRIAL APPLICABILITY

The pressure regulator regulates, up to a predetermined set pressure, a pressure in compressed air supplied from a compressor, and is used in a pneumatic circuit for supplying the pressure to a pneumatic operating appliance such as a pneumatic cylinder.

While the present invention has been illustrated and described with respect to a particular embodiment thereof, it should be appreciated by those of ordinary skill in the art that various modifications to this invention may be made without departing from the spirit and scope of the present invention.

What is claimed is:

1. A pressure regulator comprising:
a housing including a primary-side port, to which a pressure fluid is supplied, and a secondary-side port, which communicates with the primary-side port via a communication hole and from which the pressure fluid flows;
a valve assembly having a valve element, which opens and closes a valve seat formed on an opening end portion side of the communication hole, and a valve spring, which applies a spring force to bias the valve element in a direction of closing the valve seat;
a diaphragm assembly including a pressure-regulating diaphragm and a pressure-regulating spring, the pressure-regulating diaphragm being mounted in the housing opposite the valve element, and forming, by partition, a pressure-regulating chamber communicating with the secondary-side port and a spring chamber communicating with an outside, the pressure-regulating spring being mounted between a retainer provided on the pressure-regulating diaphragm and a spring receiving member disposed in the spring chamber opposite the retainer, and applying a spring force to bias the valve element in a direction of releasing the valve element from the valve seat, wherein the retainer is provided with a support rod portion protruding toward the spring receiving member;
a stem having a tip face that opens and closes a relief hole, the relief hole being formed in the support rod portion of the retainer and causing the pressure-regulating chamber and the spring chamber to communicate with each other, the relief hole being open on an end face of the support rod portion of the retainer, the stem applying a spring force of the pressure-regulating spring to the valve element, and constituting the valve assembly; and
a dynamic-vibration absorbing apparatus, which is provided around the support rod portion of the retainer and disposed in the spring chamber, suppresses a vibration of the diaphragm assembly when the pressure-regulating diaphragm is separate from the stem, and suppresses vibrations of the diaphragm assembly and the valve assembly when the valve assembly is moved with the diaphragm assembly, with the stem closing the relief hole, to open and close the valve seat and adjusts a pressure in the secondary-side port,
wherein the dynamic-vibration absorbing apparatus includes a spring member surrounding the support rod, the spring member movably connecting an annular mass body to the diaphragm assembly.

2. The pressure regulator according to claim 1, an annular damper of the dynamic-vibration absorbing apparatus is fixed to a tip of the support rod portion.

3. The pressure regulator according to claim 2, wherein the retainer has a disk portion, to which the support rod portion is provided and which contacts the pressure-regulating diaphragm, the dynamic-vibration absorbing apparatus being positioned and mounted at a tip of the support rod portion inside the pressure-regulating spring that is mounted between the disk portion and the spring receiving member.

4. The pressure regulator according to claim 1, wherein a natural frequency of the dynamic-vibration absorbing apparatus is made different from a natural frequency of a diaphragm vibration system constituted by the diaphragm assembly, and from a composite natural frequency of a composite vibration system constituted by the valve assembly and diaphragm assembly.

5. The pressure regulator according to claim 1, wherein a tip portion of the stem is provided with a seal member, which seals a communication between the secondary-side port and the pressure-regulating chamber via a penetration hole slidably supporting the tip portion of the stem.

6. The pressure regulator according to claim 1, wherein a tip portion of the stem is provided with a diaphragm, which movably supports the stem in a direction of opening and closing the relief hole, and seals a communication between the secondary-side port and the pressure-regulating chamber.

7. The pressure regulator according to claim 1, further comprising a pressure-balancing seal member, which forms a seal between the valve element and a guide hole into which the valve element is incorporated.

8. The pressure regulator according to claim 6, further comprising a pressure-balancing diaphragm, which forms a seal between the valve element and a guide hole into which the valve element is incorporated.

9. The pressure regulator according to claim 2, wherein a natural frequency of the dynamic-vibration absorbing apparatus is made different from a natural frequency of a diaphragm vibration system constituted by the diaphragm assembly, and from a composite natural frequency of a composite vibration system constituted by the valve assembly and diaphragm assembly.

10. The pressure regulator according to claim 2, wherein a tip portion of the stem is provided with a seal member, which seals a communication between the secondary-side port and the pressure-regulating chamber via a penetration hole slidably supporting the tip portion of the stem.

11. The pressure regulator according to claim 2, wherein a tip portion of the stem is provided with a diaphragm, which movably supports the stem in a direction of opening and closing the relief hole, and seals a communication between the secondary-side port and the pressure-regulating chamber.

12. The pressure regulator according to claim 2, further comprising a pressure-balancing seal member, which forms a seal between the valve element and a guide hole into which the valve element is incorporated.

\* \* \* \* \*